Feb. 27, 1962     M. D. WILSON     3,023,023

VEHICLE BANKING DEVICE

Filed May 5, 1960

WITNESSES
Robert C. Baird
James F. Young

INVENTOR
Merrideth D. Wilson.
BY
Paul E. Friedemann
ATTORNEY

United States Patent Office 3,023,023
Patented Feb. 27, 1962

3,023,023
VEHICLE BANKING DEVICE
Merrideth D. Wilson, Monroeville, Pa., assignor to Westinghouse Electric Corporation, East Pittsburgh, Pa., a corporation of Pennsylvania
Filed May 5, 1960, Ser. No. 27,033
2 Claims. (Cl. 280—112)

This invention relates to a vehicle stabilization device and more particularly to a vehicle banking device to substantially prevent the roll of a vehicle body when making a turn at a speed above a selected speed.

One broad object of this invention is the provision of means for counteracting the roll of a vehicle on a turn.

Other objects of this invention will become more apparent from a study of the following specification and the drawing, in which.

Figure 1:
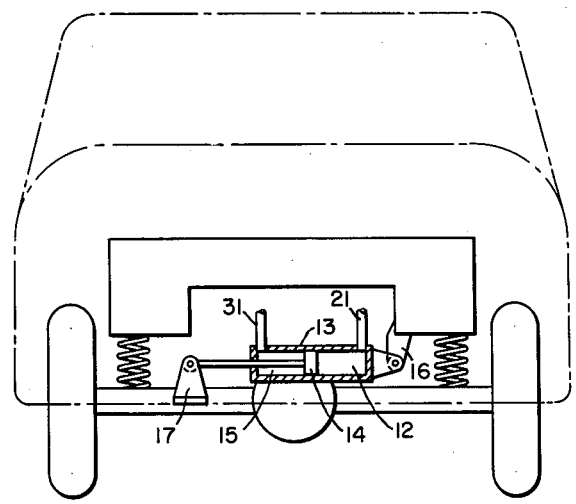
FIGURE 1 is a view from the rear of a vehicle showig the invention applied to the vehicle, with certain parts thereof shown in section.

This invention is applied to a vehicle provided with power steering of the electro-hydraulic type. In a hydraulic power steering system controlled steering is effected, in conjunction with other elements, by means of a valve, that may be of the rotating or reciprocating type, actuated on turning of the steering shaft, with the valve normally controlling the flow of fluid, under considerable pressure, between a fluid motor for actuating the steering mechanisms and a source of fluid pressure. This system is shown in block form by reference character 1.

When the steering shaft is turned to make a left turn, for example, the fluid in pipe 2 is increased over a considerable pressure range depending on the extent of angular movement of the steering shaft. When the steering shaft is turned to make a turn to the right, for example, the pressure in pipe 3 increases, depending on the extent of angular movement of the steering shaft.

The banking control of this invention is coupled to the speed of the vehicle. The mechanism 4 causes shaft 5, also coupled to the speedometer, to rotate as a function of vehicle speed. Take-off gears 6 drive the governor 7 which controls the position of the pivoted spring-biased lever 8. The governor may be of any type This lever 8 is coupled to the spool valve 9. When the vehicle is not in motion the spring 10, and associated parts, are so selected and designed that the lands of the spool valve 9 are in the position shown. This means, regardless of the position of the steering shaft at vehicle stand-still, that no fluid pressure is transmitted itno the pipes 21 and 31.

When the vehicle is in motion at any selected speed as, we say five, or twenty miles an hour, or more and the steering shaft is turned, then fluid pressure is allowed to pass into pipes 21 and 31.

If a left turn is to be effected, the pressure in pipe 21 is increased and fluid flows into the right chamber of cylinder 13, driving the piston 14 to the left. See FIGURE 1. The volume of chamber 15 decreases and the fluid in this chamber is exhausted through pipe 31.

The cylinder 13 is coupled to the sprung mass at 16 and the outer end of the piston rod is coupled to the unspring mass, as the axle housing for the drive vehicle wheels. The cylinder is positioned horizontally well below the center of gravity of the spring mass and well below the normal longitudinal roll axis of the vehicle. This means that when a left turn is being made at a speed greater than twenty miles an hour the sprung mass is caused to move in a counter-clockwise direction about its roll axis, therefore, substantially completely counteracting the clockwise tilt that the centrifugal force tends to cause.

When a turn to the right is being made at more than twenty miles an hour the high pressure fluid is admitted to chamber 15 and the fluid in chamber 12 is exhausted through pipe 21. The vehicle is now banked clockwise about its roll axis, thus eliminating the outward tilt the centrifugal force tends to cause.

There will be a delay in the time required for the car body to get into its new orientation when it receives oil from the power steering pump, but there is a similar delay in time required by the front wheels to effect a turn, after they have been commanded by the power steering system. This provides some anticipation for improved bank control performance.

High frequency vibrations of the spring with reference to the unsprung mass are controlled by the shock absorbing means of the vehicle. However, so as not to produce any effect on the banking control the cylinder 13 is so placed that the shock absorbing means have no effect on the banking control.

Figure 2:
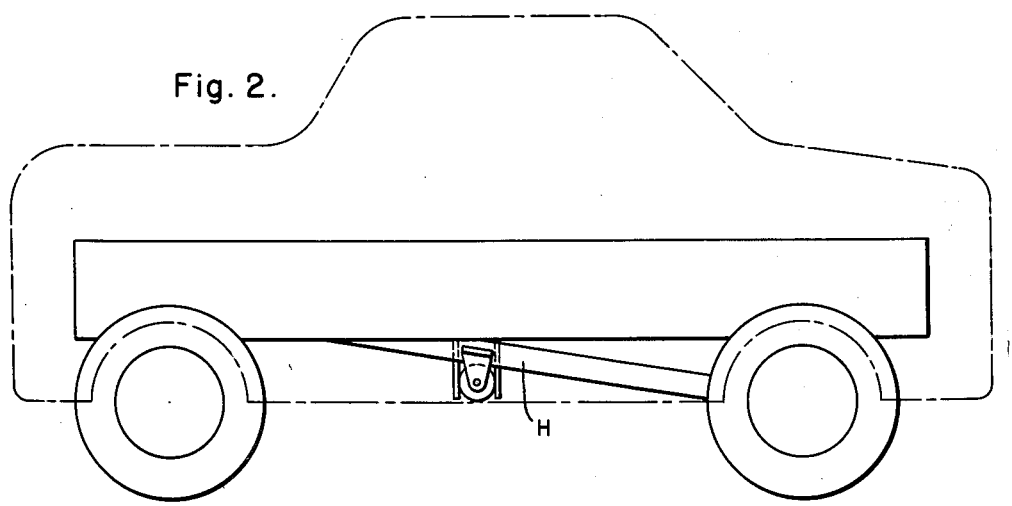
FIG. 2 is a side veiw of a vehicle with the invention shown positioned in a different position on the vehicle.
Figure 3:
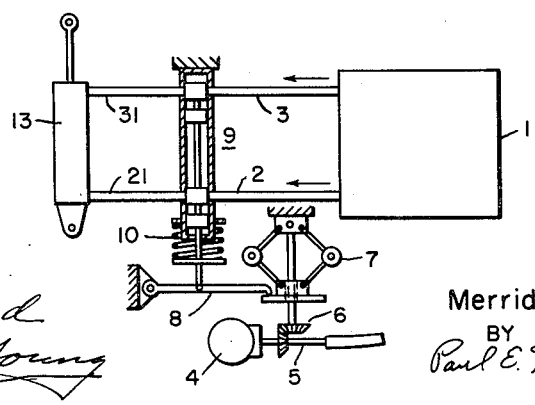
FIG. 3 is a diagrammatic showing of the details of this invention.

In some cases it may be desirable to mount the cylinder more nearly below the center of gravity of the sprung mass. This arrangement is shown in FIG. 2. In this case the piston rod end is secured to the drive shaft housing H and the cylinder is coupled to the sprung mass.

While but one embodiment and one modification have been disclosed, it is, of course, to be understood that further modifications are possible, all falling within the spirit and scope of this invention.

I claim as my invention:

1. In apparatus for banking an automotive vehicle provided with power steering and having springs, one associated with each wheel, interconnecting the sprung mass, as the frame carrying the engine, the body, etc., with the unsprung mass, as the drive shaft housing, the axles, the wheels, etc., in combination, an actuator including a pair of relatively movable parts comprising a cylinder and a piston in the cylinder having a connecting rod projecting through a seal from the cylinder, one of the relatively movable parts being coupled to the sprung mass and the other to the unsprung mass, said actuator being positioned on the vehicle the banking of which is to be controlled so that the line of relative movement of the piston and cylinder falls in a horizontal plane below the roll axis of the sprung mass and falls in a plane near the center of gravity of the sprung mass and which plane is substantially normal to the roll axis, whereby relative movement of the relatively movable parts, upon application of a differential fluid pressure on opposite sides of the piston, will cause the sprung mass to tilt about the roll axis, and means coupled to the power steering to so change the pressure of fluid in the cylinder on the two sides of the piston that the sprung mass is tilted toward the inside of the turn being made by the vehicle.

2. In apparatus for banking an automotive vehicle provided with power steering and having springs, one associated with each wheel, interconnecting the sprung mass, as the frame carrying the engine, the body, etc., with the unsprung mass, as the drive shaft housing, the axles, the wheels, etc., in combination, an actuator including a pair of relatively movable parts comprising a cylinder and a piston in the cylinder having a connecting rod projecting through a seal from the cylinder, one of the relatively movable parts being coupled to the sprung mass and the other to the unsprung mass, said actuator being positioned on the vehicle the banking of which is to be controlled so that the line of relative movement of the piston and cylinder falls in a horizontal plane below the roll axis of the sprung mass and falls in a plane near the center of gravity of the sprung mass and which plane is substantially normal to the roll axis, whereby relative movement of the relatively movable parts, upon application of a differential fluid pressure on opposite sides of the piston, will cause the sprung mass to tilt about the roll axis, and means coupled to the power steering to so change the pressure of fluid in the cylinder on the two sides of the piston that the sprung mass is tilted toward the inside of the turn being made by the vehicle, and means responsive to vehicle speed for controlling the tilting of the sprung mass as a function of vehicle speed.

References Cited in the file of this patent
UNITED STATES PATENTS 2,804,311     Pobanz _____ Aug. 27, 1957

FOREIGN PATENTS 735,435     France _____ Aug. 30, 1932